Figures 1, 2:
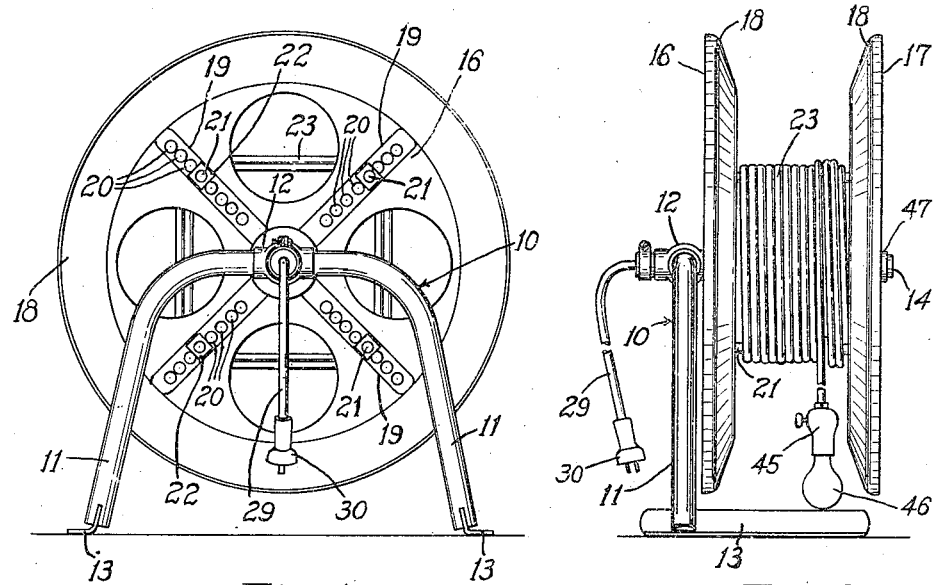

Aug. 30, 1949.  R. R. EDWARDS  2,480,401
CONTINUOUS CONTACT REEL FOR ELECTRIC CORDS
Filed Sept. 20, 1947  2 Sheets-Sheet 1

Inventor
Robert Ray Edwards
By Frease and Bishop
Attorneys

INVENTOR.
Robert Ray Edwards

Patented Aug. 30, 1949

2,480,401

UNITED STATES PATENT OFFICE 2,480,401

CONTINUOUS CONTACT REEL FOR ELECTRIC CORDS

Robert Ray Edwards, Alliance, Ohio

Application September 20, 1947, Serial No. 775,289

5 Claims. (Cl. 191—12.4)

1

The invention relates to reels for electric cords or wire cables, extensible incandescent lamps, portable electrically driven machines and the like, where an ever varying amount of cord or cable is used, and more particularly to such a reel having continuous contact means therein.

An object of the invention is to provide such a reel upon which a considerable amount of cord or cable may be wound, and which may be turned as required to wind or unwind the cable whenever it is desirable or necessary to change the position of the incandescent lamp or machine and at the same time provide a continous, uninterrupted flow of electric current from the source of supply to the lamp or electrically operated machine.

Another object is to provide such a reel in which the continuous contact mechanism is located within the hub portion of the reel.

A further object is to provide a reel of this character in which the continuous contact mechanism includes a pair of insulation tubes, one of which is fixed upon the shaft on which the reel is journalled and the other tube acts as a spacer for the heads of the reel and rotates therewith.

A still further object is to provide such a reel in which contact rings are mounted in the stationary insulation and connected by wires to a source of electric power, and spring loaded brushes of carbon or the like, continuously contact said rings and are connected to the cord or cable wound upon the reel.

It is another object of the invention to provide a simple, durable and easily operated reel of the character referred to, upon which the electric cord or cable may be easily and readily wound or unwound and in which continuous contact will be had at all times.

Figure 3:
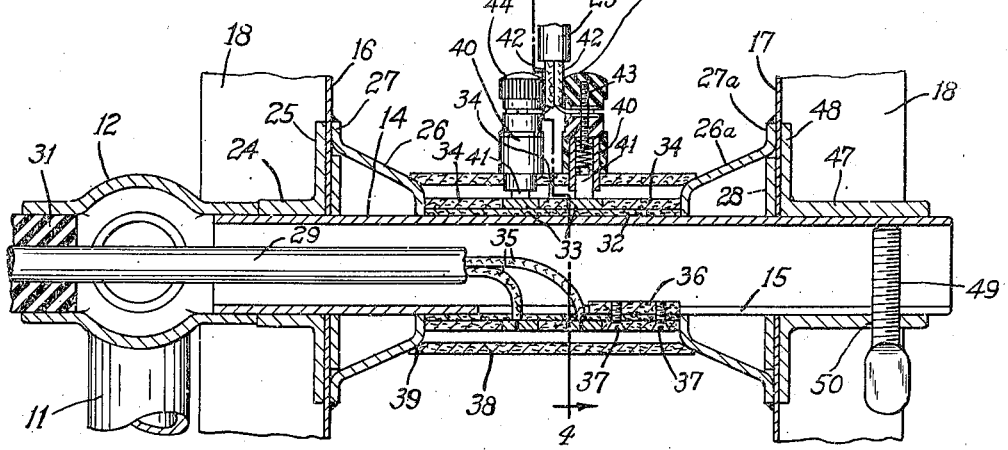
Figure 4:
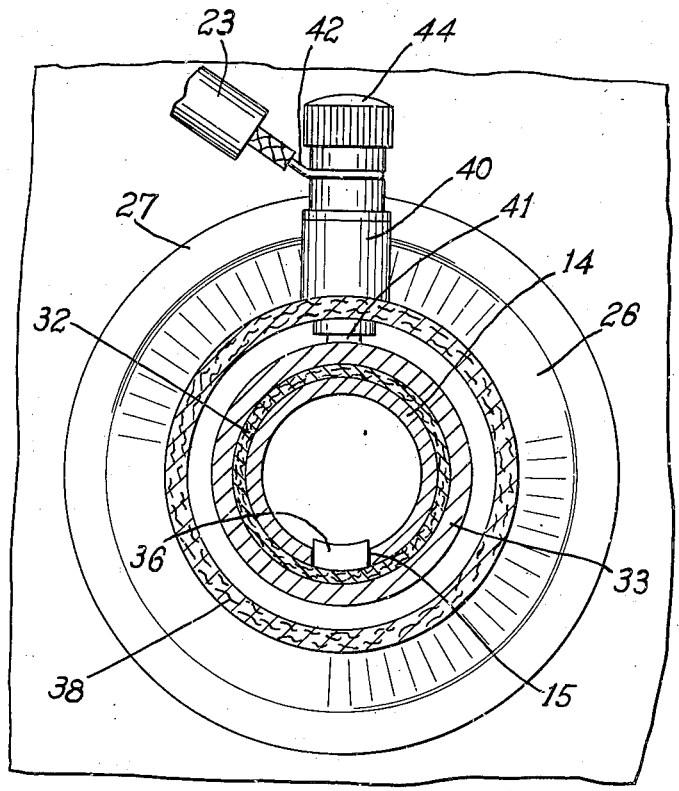

The above objects, together with others which will be apparent from the drawing and following description, or which may be later referred to, may be attained by constructing the improved reel in the manner hereinafter described in detail and illustrated in the accompanying drawing, in which;

Figure 1 is a front elevation of a reel constructed in accordance with the invention;

Fig. 2 a side elevation of the reel;

Fig. 3 an enlarged longitudinal sectional view through the journal portion of the reel, showing the continuous contact mechanism; and, Fig. 4 a transverse section on the line 4—4, Fig. 3.

The reel may be mounted upon a stand or frame which may be easily transported or which may be permanently attached to any suitable support. This frame may comprise an inverted U-shape standard indicated generally at 10, which may be formed of two bent tubular members 11 connected at their upper ends by a cross coupling 12, a base portion, in the form of an angle iron 13, being attached to the lower end of each leg 11 and horizontally disposed for contact with or attachment to any horizontal supporting surface.

A hollow shaft 14 is connected at one end to the cross coupling 12 and located at a right angle to the plane of the U-shape upright 10, and forms the journal bearing for the reel. This shaft has a longitudinal slot in its under side extending through the outer end of the shaft.

The reel proper comprises a pair of heads 16 and 17, which may be discs of sheet metal or the like having outwardly flared peripheral portions 18, and radial ribs 19 pressed therein, a series of apertures 20 being formed in each rib for selective insertion of the bolts or rods 21, which may be secured by nuts 22, and about which the electric cord or cable 23 may be wound.

The head 16 is journalled upon the shaft 14 by means of the tubular bearing member 24, having a flange 25 which may be welded or otherwise secured to the outer surface of the disc 16, and a conical bearing member 26 having a peripheral flange 27 which may be welded or otherwise rigidly attached to the inner side of the disc 16.

The disc 17 has a conical bearing member 26a attached to its inner side by means of the peripheral flange 27a thereof, which may be welded or otherwise securely attached to the inner side of the disc 17. If desired a reinforcing ring 28 may be attached to the inner side of the disc 17 within the conical bearing 26a.

An electric cord or cable 29, having at one end a conventional attachment plug 30 for connecting to a source of electric power, has its other end located through the cross coupling 12 and into the shaft 14, and an insulation plug 31 is preferably provided in the outer end of the cross coupling 12 surrounding said cord or cable.

A tube 32 of fibre or other suitable insulation material is located around the shaft 14, between the conical bearing members 26 and 26a of the heads and two or more spaced contact rings 33, of copper or the like are located around said insulating tube, spacing rings 34 of fibre or other suitable insulation material being located around the tube 32, between and on each side of the contact rings 33.

Each of the wires 35 of the cable or cord 29 is connected to one of the contact rings 33 as best shown in Fig. 3. For the purpose of preventing rotation of the insulation tube 32 and contact rings 33 relative to the shaft 14, an inwardly disposed lug 36, of insulation material, is connected to the tube 32 as by screws 37 and located within the longitudinal slot 15 of the shaft.

A tube 38 of fibre or other insulation material, of considerably larger diameter than the contact rings, is located between the conical bearing members 26 and 26a of the heads, the ends of the tube 38 being preferably bevelled, as indicated at 39, so that when the heads 16 and 17 are drawn toward each other, the tube 38 will be properly centered with reference to the reel and shaft and clamped between the conical bearing members of the heads so as to rotate with the heads, forming a spacer and hub for the heads of the reel.

Brush holders 40, preferably of insulation material, corresponding in number and position to the contact rings 33, are carried by the insulation tube 38 and provided with spring loaded brushes 41 which may be of carbon or similar material for contact with the rings 33.

The wires 42 of the cord or cable 23 are individually attached to the terminal posts 43 of the several brushes by means of binding nuts or caps 44, which are also preferably formed of insulation material.

The cord or cable 23 is then wound around the rods or bolts 21 of the reel and the outer end of the cord may have a base receptacle 45 connected thereto for attachment of an incandescent lamp 46 where an extensible lamp is desired, or the end of the cord or cable 23 may be attached to any portable electrically driven machine, tool or appliance.

The reel is held in position upon the shaft 14 by means of the flanged collar 47, surrounding the outer end portion of the shaft and having the annular flange 48 for contact with the outer surface of the disc 17, this collar being detachably secured upon the shaft by means of a set screw 49 threaded through a tapped opening 50 in the collar and located through the longitudinal slot 15 in the shaft and contacting the inner surface of the tubular shaft at a point diametrically opposite to the slot 15, as best shown in Fig. 3.

From the above it will be obvious that a simple, inexpensive and easily operated continuous contact reel is provided in which the continuous contact mechanism is all housed within the hub of the reel and is easily and readily accessible for making repairs or replacements.

I claim:

1. A continuous contact reel for electric cable and the like comprising a support, a hollow shaft attached at one end to said support and having a longitudinal slot extending through its other end, a spaced pair of heads journalled upon said shaft, opposed, conical bearing members upon the heads, an insulation tube upon the shaft between said conical bearing members, a lug upon the interior of said insulation tube located in said longitudinal slot in the shaft, spaced contact rings upon the insulation tube, wires leading from a source of electric supply located through one end of said hollow shaft and connected to said contact rings, a second insulation tube of larger diameter than the first named insulation tube and having its ends in contact with and bearing against said conical bearing members whereby said second insulation tube is concentrically spaced around the first named insulation tube, brushes carried by said second named insulation tube and contacting said contact rings, an electric cable having individual wires connected to said brushes, means carried by said heads around which said cable may be wound and means for drawing said heads toward each other for clamping said second insulation tube between said conical bearing members and centering the tube relative to the shaft.

2. A continuous contact reel for electric cable and the like comprising a support, a hollow shaft attached at one end to said support and having a longitudinal slot extending through its other end, a spaced pair of heads journalled upon said shaft, opposed, conical bearing members upon the heads, an insulation tube upon the shaft between said conical bearing members, a lug upon the interior of said insulation tube located in said longitudinal slot in the shaft, spaced contact rings upon the insulation tube, wires leading from a source of electric supply located through one end of said hollow shaft and connected to said contact rings, a second insulation tube of larger diameter than the first named insulation tube and having its ends in contact with and bearing against said conical bearing members whereby said second insulation tube is concentrically spaced around the first named insulation tube, brushes carried by said second named insulation tube and contacting said contact rings, an electric cable having individual wires connected to said brushes, means carried by said heads around which said cable may be wound and a flanged collar upon the free end portion of the shaft for drawing said heads toward each other for clamping said second insulation tube between said conical bearing members and centering the tube relative to the shaft.

3. A continuous contact reel for electric cable and the like comprising a support, a hollow shaft attached at one end to said support and having a longitudinal slot extending through its other end, a spaced pair of heads journalled upon said shaft, opposed, conical bearing members upon the heads, an insulation tube upon the shaft between said conical bearing members, a lug upon the interior of said insulation tube located in said longitudinal slot in the shaft, spaced contact rings upon the insulation tube, wires leading from a source of electric supply located through one end of said hollow shaft and connected to said contact rings, a second insulation tube of larger diameter than the first named insulation tube and having its ends in contact with and bearing against said conical bearing members whereby said second insulation tube is concentrically spaced around the first named insulation tube, brushes carried by said second named insulation tube and contacting said contact rings, an electric cable having individual wires connected to said brushes, means carried by said heads around which said cable may be wound and a flanged collar upon the free end portion of the shaft for drawing said heads toward each other for clamping said second insulation tube between said conical bearing members and centering the tube relative to the shaft, and a set screw in said flanged collar located through the slot in the tubular shaft and contacting the inner side of the shaft diametrically opposite to the slot for securing the collar upon the shaft.

4. A continuous contact reel for electric cable and the like comprising a support, a hollow shaft attached at one end to said support and having a longitudinal slot extending through its other end, a spaced pair of heads journalled upon said shaft, opposed, conical bearing members upon the heads, an insulation tube upon the shaft between said conical bearing members, a lug upon the interior of said insulation tube located in said longitudinal slot in the shaft, spaced contact rings upon the insulation tube, wires leading from a source of electric supply located through one end of said hollow shaft and through the slot in the shaft and connected to said contact rings, a second insulation tube of larger diameter than the first named insulation tube and having its ends in contact with and bearing against said conical bearing members whereby said second insulation tube is concentrically spaced around the first named insulation tube, brushes carried by said second named insulation tube and contacting said contact rings, an electric cable having individual wires connected to said brushes, means carried by said heads around which said cable may be wound and means for drawing said heads toward each other for clamping said second insulation tube between said conical bearing members and centering the tube relative to the shaft.

5. A continuous contact reel for electric cable and the like comprising a support, a hollow shaft attached at one end to said support and having a longitudinal slot extending through its other end, a spaced pair of heads journalled upon said shaft, opposed, conical bearing members upon the heads, an insulation tube upon the shaft between said conical bearing members, a lug upon the interior of said insulation tube located in said longitudinal slot in the shaft, spaced contact rings upon the insulation tube, wires leading from a source of electric supply located through one end of said hollow shaft and connected to said contact rings, a second insulation tube of larger diameter than the first named insulation tube and having its ends in contact with and bearing against said conical bearing members whereby said second insulation tube is concentrically spaced around the first named insulation tube, brushes carried by said second named insulation tube and contacting said contact rings, an electric cable having individual wires connected to said brushes, means carried by said heads surrounding said second insulation tube around which said cable may be wound and means for drawing said heads toward each other for clamping said second insulation tube between said conical bearing members and centering the tube relative to the shaft.

ROBERT RAY EDWARDS.

REFERENCES CITED

The following references are of record in the file of this patent:

UNITED STATES PATENTS

| Number | Name | Date |
|---|---|---|
| 1,159,124 | Steen | Nov. 2, 1915 |
| 2,127,772 | Horn et al. | Aug. 23, 1938 |

FOREIGN PATENTS

| Number | Country | Date |
|---|---|---|
| 428,583 | Germany | May 6, 1926 |